Nov. 28, 1944. E. BLAIR 2,363,635
METHOD AND APPARATUS FOR FORMING TUBES BY EXTRUSION
Filed April 13, 1942 3 Sheets-Sheet 1
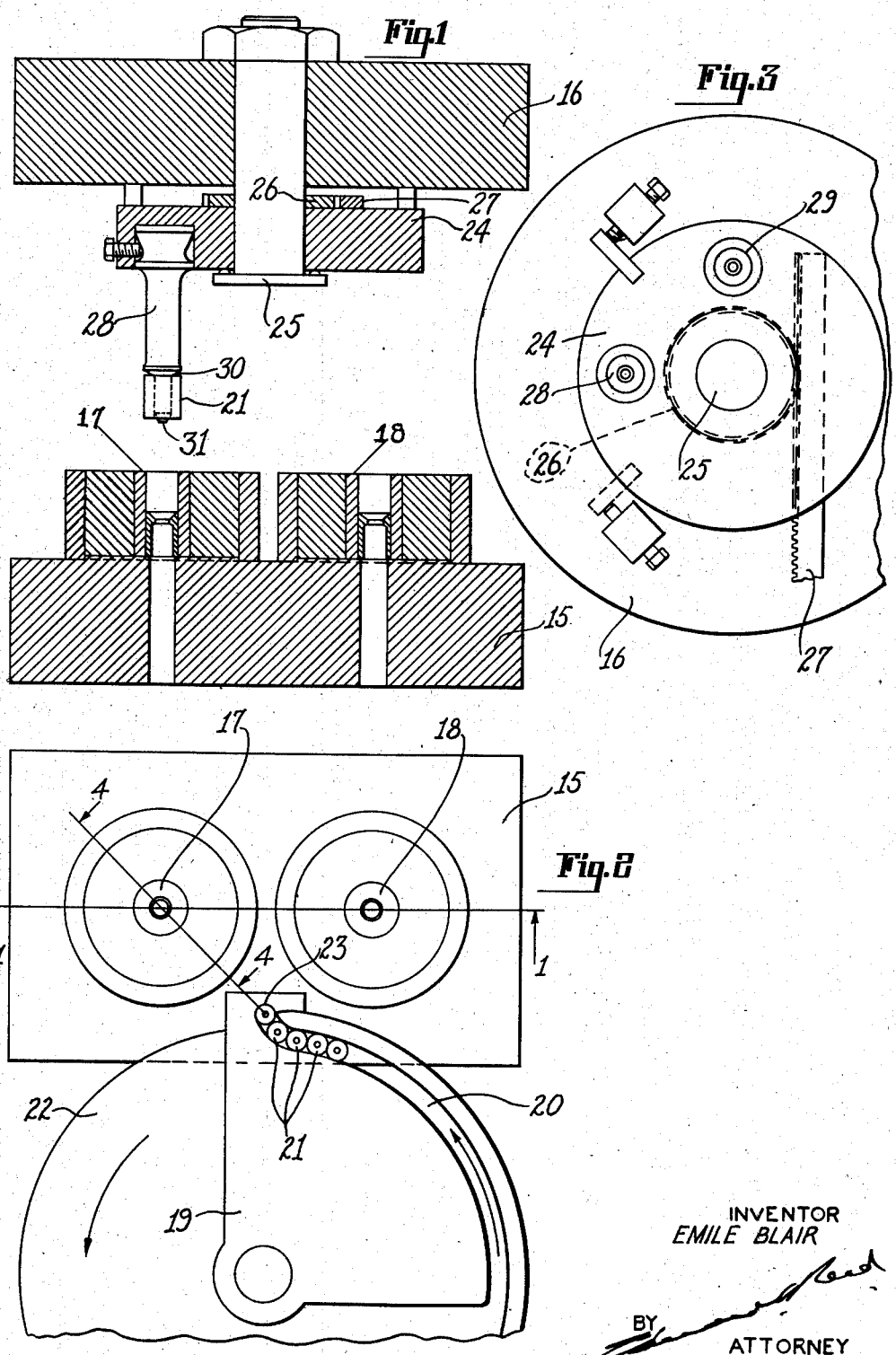
INVENTOR
EMILE BLAIR
BY
ATTORNEY

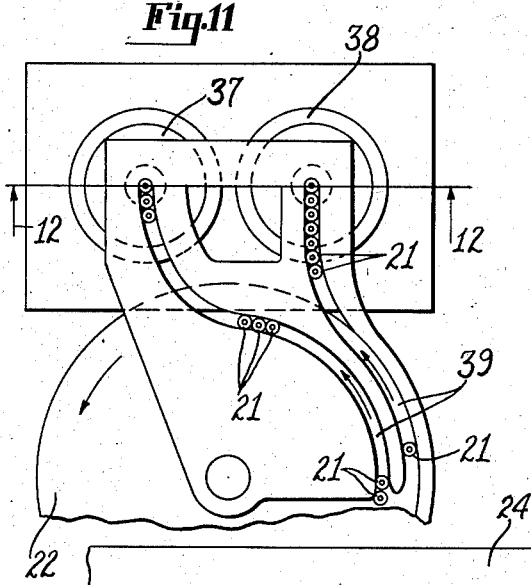
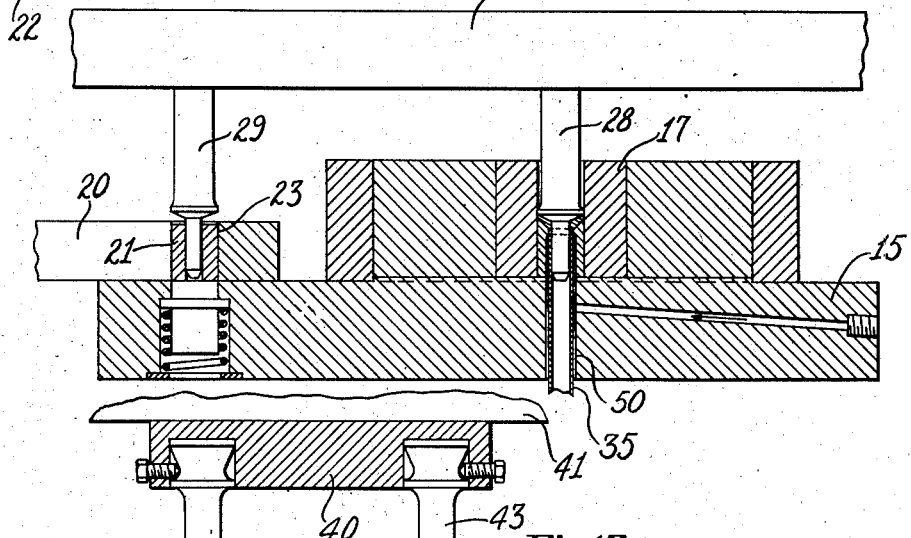
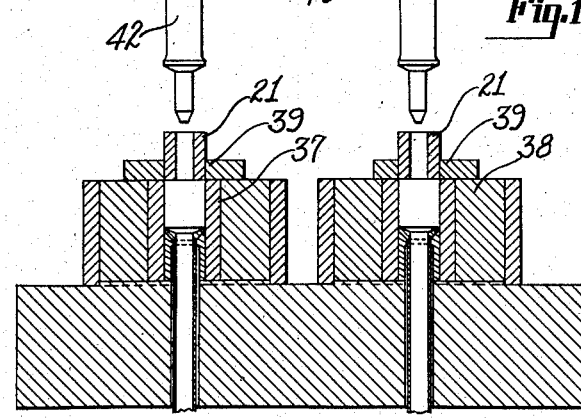
INVENTOR
EMILE BLAIR

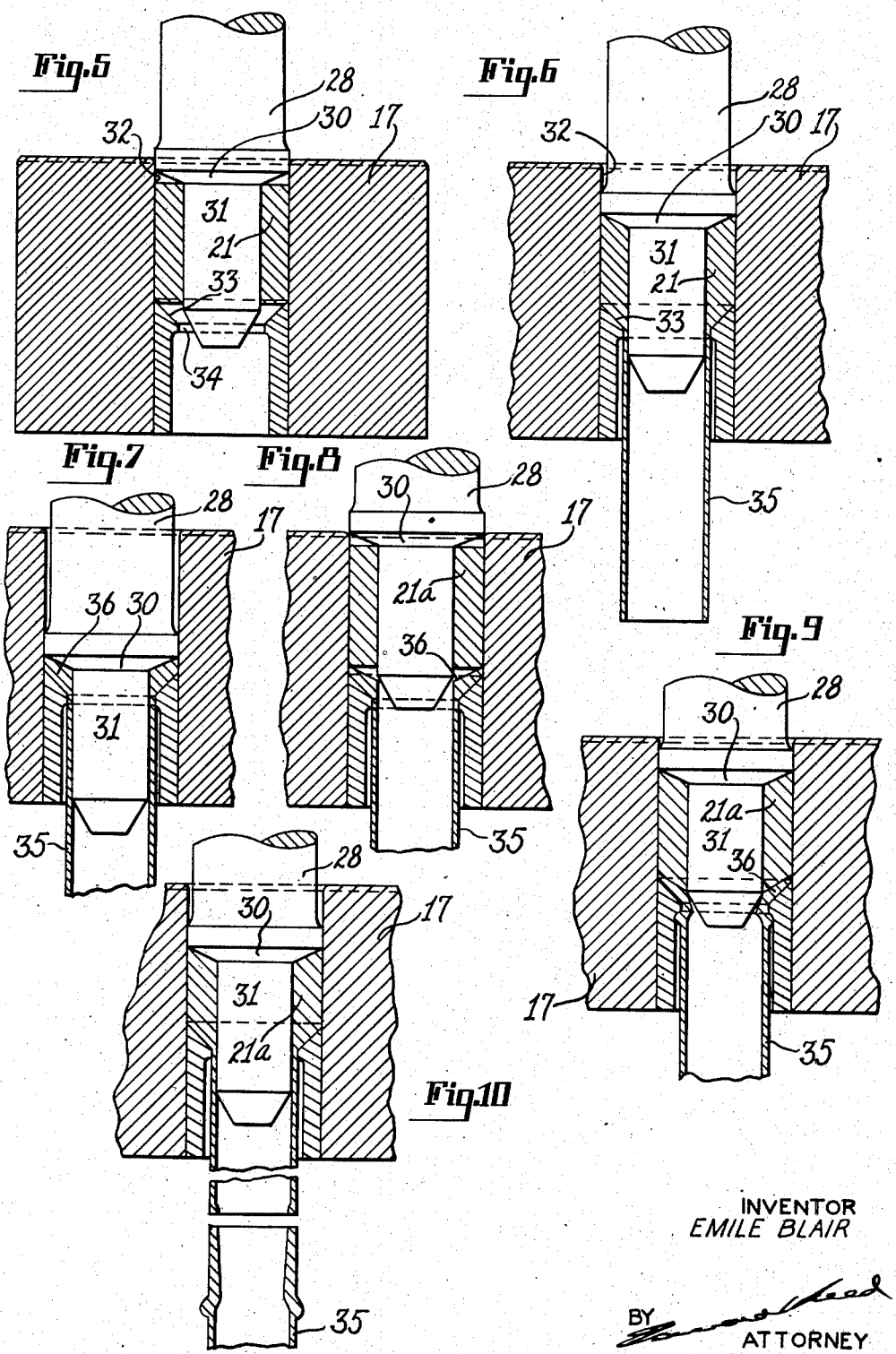

Patented Nov. 28, 1944

2,363,635

UNITED STATES PATENT OFFICE 2,363,635

METHOD AND APPARATUS FOR FORMING TUBES BY EXTRUSION

Emile Blair, Dayton, Ohio, assignor to Standard Aircraft Products, Inc., a corporation of Delaware Application April 13, 1942, Serial No. 438,764

4 Claims. (Cl. 207—3)

This invention relates to a method and apparatus for forming tubes by extrusion.

It is old in the art to subject a metal blank to impact and high pressure by a punch in a die to heat the blank to a temperature at which the metal will flow and to force the heated metal from the die in the form of a tube. It is not feasible to so operate the punch as to force all the metal out of the die but there remains in the die, at the end of each extruding operation, a small portion of the metal, commonly called a scrap ring, and it is necessary to sever this scrap ring from the extruded tube and remove the same from the die. In extruding tubes in this manner it has been customary to provide a power press with two dies and with two pairs of punches, each pair including an extruding punch and a punch to sever and remove the scrap ring, the latter punch being commonly called the pinching punch. The several punches are carried by a supporting element rotatably mounted on the ram of the press. The extruding punches cooperate with the respective dies and upon one down-stroke of the ram one extruding punch will enter its die and extrude a blank therefrom in the form of a tube; the second extruding punch will be moved into supporting engagement with another blank at a source of supply; one pinching punch will enter the second die and sever the scrap ring from a previously extruded tube in that die; and the second pinching punch will move a previously removed scrap ring into engagement with a stripping device. Upon the up-stroke of the ram the scrap ring severed by the first mentioned pinching punch is removed from the second die; the scrap ring is stripped from the second pinching punch; the punch support is rotated through an arc of ninety degrees to move the second extruding punch and the blank supported thereby into line with the second die; to move the first mentioned extruding punch into line with the source of supply of blanks; to move the first mentioned pinching punch into line with the stripping device; and to move the second pinching punch into line with the first mentioned die. Upon the next down-stroke of the ram the first mentioned extruding punch is moved into supporting engagement with a blank; the second extruding punch inserts its blank in the second die and extrudes the same; the first mentioned pinching punch moves the scrap ring thereon into engagement with the stripping device; and the second pinching punch severs the scrap ring in the first mentioned die. Upon the next up-stroke of the ram the punch support is rotated in the opposite direction to restore the punches to their initial positions. By this series of operations a tube is extruded upon each operation of the ram but this requires the use of the two pinching punches and the stripping device in addition to the extruding punches. In the operation of such a mechanism the lower portions, that is, the portions first extruded, of a substantial number of tubes will be so soft and weak that they may be crushed between the thumb and finger and are unfit for use, although the major portion of the tube will be of sufficient rigidity. An extremely high pressure is required to heat the blank to a temperature approaching the melting point so as to enable it to be forced through the die orifice but after the metal has begun to flow the pressure necessary to force the metal through the orifice decreases rapidly. It is believed that the excessive pressure and heat necessary to initiate the flow of the metal causes the above mentioned defect in a part of the tubes, that is the soft, weak lower portions thereof. It is customary to flow a cooling medium, such as oil, through the lower portion of the die and about the tube as it is extruded but this cooling action does not prevent the forming of soft lower portions in many of the tubes.

One object of the present invention is to provide a method and apparatus for extruding tubes of such a character that substantially all the tubes will be of adequate rigidity throughout their length.

A further object of the invention is to provide such a method in which it will be unnecessary to sever and remove the scrap ring, thus eliminating the pinching punches and the stripping device.

A further object of the invention is to provide such a method and apparatus whereby two tubes may be extruded upon each operation of the ram.

A further object of the invention is to provide an extruding mechanism which will be very simple in its construction and operation and which can be constructed and maintained at relatively low cost.

Other objects of the invention may appear as the method and apparatus are described in detail.

In the accompanying drawings Fig. 1 is a section taken on the line 1—1 of Fig. 2, through a press equipped to extrude tubes in accordance with my invention; Fig. 2 is a top plan view of the dies and source of supply of blanks; Fig. 3 is a bottom plan view of the ram and the punches; Fig. 4 is a section taken on the line 4—4 of Fig. 2, looking in the direction of the arrows; Fig. 5 is a sectional view of the die showing the punch in blank inserting position; Fig. 6 is a similar view showing a portion of the blank extruded in tubular form; Fig. 7 is a similar view showing the scrap ring in the die at the end of the extruding operation; Fig. 8 is a similar view showing a second blank inserted in the die in contact with the scrap ring of the preceding blank; Fig. 9 is a similar view showing the extrusion of the scrap ring; Fig. 10 is a similar view showing the scrap ring only extruded and the second blank partially extruded; Fig. 11 is a plan view of the dies and blank feeding device of a modified form of the apparatus; and Fig. 12 is a section taken through the dies and punch support on the line 12—12 of Fig. 11.

In accordance with my method the scrap ring which remains in the die after the major portion of the blank has been extruded is not removed but a second blank is inserted in the die in contact with the scrap ring and subjected to pressure to heat both the second blank and the scrap ring and to extrude the scrap ring and the major portion of the second blank. Thus by the transfer of a portion of the pressure generated heat from the blank to the scrap ring excessive heating of the blank is prevented and the extruded tubes are free from weakness and are of substantially uniform rigidity throughout their length.

In Figs. 1 to 4 I have illustrated one form of apparatus for extruding blanks by this method and have shown the bed plate 15 and ram 16 of an ordinary power press. The bed plate has mounted thereon two dies 17 and 18 and has associated therewith a source of supply of blanks. Preferably this source of supply comprises a structure 19 provided with a curved guideway 20 adapted to receive a series of blanks 21. A disk 22 is mounted beneath the structure 19 for rotation in the direction of the arrow and this disk forms a support for the blanks and tends constantly to move the blanks forwardly through the guideway. The inner end of the guideway is closed at 23 and is so located as to accurately locate the innermost blank in a predetermined position. The disk having no positive connection with the blanks continues to rotate while the blanks are stationary and advances the blanks only after an innermost blank has been removed. Mounted on the lower face of the ram 16 is a punch supporting element, here shown as a circular plate 24 rotatably supported on the ram by a pivot pin 25. A gear 26 is rigidly secured to the punch supporting elements, preferably between the same and the face of the ram, and a rack bar 27 engages the gear to rotate the same and the punch support. The mechanism so far described has been used heretofore in tube extruding mechanisms and the rack 27 may be actuated to impart a predetermined rotation, preferably ninety degrees, to the punch support upon each up-stroke of the ram by the same mechanism that has been heretofore used for that purpose.

Rigidly secured to the punch supporting element are two extruding punches 28 and 29, these punches being spaced apart ninety degrees and arranged to move in a circle intersecting both dies, 17 and 18, and the innermost blank at the source of supply. With the punches in the position shown in the bottom plan view of Fig. 3 the punch 28 is in line with the die 17 and the punch 29 is in line with the innermost blank 21 at the source of supply. Each punch is provided with an annular pressure surface 30 and a downwardly projecting portion 31 of reduced diameter adapted to fit snugly within the aperture in the blank and to have sufficient frictional contact therewith to support the blank on the end of the punch. With the punches in the above mentioned positions the down-stroke of the ram will cause the punch 28 to insert a blank supported thereby in the die 17 and extrude the same, and the punch 29 will be moved into supporting engagement with the innermost blank 21 of the source of supply. Upon the up-stroke of the ram the punch support is rotated to move the punch 28 into line with a blank at the source of supply and to move the punch 29 and the blank supported thereby into line with the die 18, so that upon the next down-stroke of the ram the punch 28 will pick up a blank and the punch 29 will insert its blank in the die 18 and extrude the same. As above explained the scrap rings which remain in the dies at the end of the extruding stroke are not removed and each succeeding blank is inserted in its die in contact with the scrap ring of the preceding blank and both the scrap ring and the major portion of the inserted blank are extruded by the action of the punch.

Each die has in its upper portion a cylindrical opening 32 of a diameter corresponding to the diameter of the pressure surface 30 of the punch. The bottom of the die is in the form of a downwardly sloping annular shoulder 33 which forms, at the bottom of the opening 32, an orifice 34 of a diameter slightly greater than the diameter of the blank supporting portion 31 of the punch, so that when this portion of the punch enters the orifice 34 there is formed between the part 31 of the punch and the shoulder 33 an annular passageway or orifice through which the metal of the blank is extruded in tubular form, the bed plate 15 being provided with an opening 50 in line with the orifice 34, through which the extruded tube may pass.

The ram operates at high speed and at high pressure so that the extruding operation is effected almost instantly. In Figs. 5 to 10 I have illustrated progressively the successive extrusion of two blanks. In Fig. 5 the punch 28 is shown as having just inserted the blank 21 in the die 17, which did not contain a scrap ring. The lower end of the blank has just engaged the sloping bottom wall of the die and the tapered end of the portion 31 of the die extends through the orifice 34. As shown in Fig. 6 the pressure and impact of the punch have heated the blank to soften the same and the continued pressure of the punch has initiated the extrusion of the metal, the cylindrical portion of the part 31 of the punch having entered the orifice 34 to form the annular passageway so that the metal is extruded in tubular form, as shown at 35. Fig. 7 shows the punch 28 at the lower limit of its stroke, the major portion of the blank having been extruded and the scrap ring 36 remaining in the die. The punch is then withdrawn and upon the next stroke of the ram picks up another blank and upon the second succeeding stroke inserts this blank, 21a, in the die 17 in contact with the scrap ring 36, as shown in Fig. 8. The continued pressure of the punch on the blank 21a heats the same to high temperature and a portion of this heat is transferred to the scrap ring 36 and softens the same. At this time the tapered end of the part 31 of the punch is within the orifice 34 of the punch and the annular passageway is of a correspondingly increased width, thus permitting a relatively thick portion of the scrap ring to be extruded through the orifice, as shown in Fig. 9. As the pressure continues the width of the annular passageway decreases, until the cylindrical portion 31 of the punch enters the orifice and thus establishes the normal width of a passageway, so that after the scrap ring has been fully extruded, as shown in Fig. 10, and the metal of the blank 21a begins to flow through the orifice the latter is a proper size to form the tube. The scrap ring does not adhere to the tube 21a but is separately discharged as soon as it has been completely extruded through the orifice.

As will be apparent from the foregoing description the tube is extruded from one or the other of the dies upon each down-stroke of the ram. These tubes are of substantial uniform rigidity throughout their length due to the transfer of a portion of the heat from the inserted blank to the scrap ring, thus preventing the overheating of the blank at the beginning of the extruding operation. Further, by this method a tube is extruded upon each operation of the ram by the use of two punches only, the pinching punches and the stripping device being entirely eliminated. This not only reduces the initial cost of the apparatus but it also reduces the cost of maintaining the apparatus in operative condition.

In Figs. 11 and 12 is illustrated a modified form of apparatus for carrying out the method in a modified manner whereby two tubes are extruded upon each operation of the ram and the mechanism is further simplified by the elimination of other moving parts. In Fig. 11 the dies 37 and 38 are arranged substantially as shown in Fig. 2 and the blank feeding device is substantially similar to that shown in Fig. 2, except that it is provided with two guideways 39 leading to the respective dies 37 and 38, the blanks 21 being moved through these guideways by a revolving disk 22, as above described. These guideways extend across the bed plate and die blocks and their closed ends are arranged above the die blocks in such relation to the die openings that the blanks 21 when in contact with the end walls of the guideways will be directly in line with the respective die openings. The blanks fit snugly within the die openings and will not ordinarily move into the openings by gravity but will be supported above the same, as shown in Fig. 12. The punch support 40 is rigidly secured to the ram 41 so that it has no movement with relation thereto and the punches 42 and 43 are supported permanently in alinement with the respective dies 37 and 38, so that upon each down-stroke of the ram each punch inserts a blank in the corresponding die and extrudes the same, the scrap rings remaining in the dies when the punches are withdrawn, and the next succeeding blanks being inserted in contact with the scrap rings and serving to heat and extrude the scrap rings. The feeding of the blanks to the dies is so controlled that a blank will be properly positioned with relation to each die after the punch has been withdrawn from the die and prior to or during the initial portion of the next down-stroke of the punch. Any suitable means may be employed for so feeding the blanks to the dies, and with the mechanism here illustrated the movement of the blanks into line with the dies is in part controlled by the punches. The disk 22 tends constantly to advance the rows of blanks in the respective guideways and when the punch has been inserted in the die the blank next following the blank which has been inserted by the punch contacts with the punch and is held against movement until the punch has been withdrawn and it is then quickly moved into line with the die.

The feeding of a blank to each die prior to each down-stroke of the punches has various advantages in addition to materially reducing the number of operations necessary to the extrusion of each tube and enabling two tubes to be extruded upon each reciprocation of the ram. When the blank is to be picked up and moved into line with the die by the punch the aperture in the blank must be of exactly the right size to provide the proper frictional contact with the punch and to enable the punch to enter the aperture without distorting or otherwise injuring the blank. This requires precision work in forming the blanks and increases the cost thereof. When the blank is positioned with relation to the die by means other than the punches the size of the aperture may vary more or less without objectionable results, thus avoiding the necessity for precision work and facilitating the production of the blanks. If a blank is slightly out of line with the opening in the die the tapered end of the punch will enter the aperture in the blank and accurately aline the same. Further when the punches are carried by a movable support they will sometimes get out of line with the dies, due to vibration or other causes, and the failure of a punch to properly enter its die is very apt to break or otherwise injure the punch. This danger is avoided by mounting the punches in positions fixed with relation to the ram, whereby they are maintained in accurate alinement with the dies at all times.

While I have shown and described my method and certain forms of apparatus for carrying out the same I wish it to be understood that I do not desire to be limited to the details of the method and apparatus as various modifications therein may occur to a person skilled in the art.

Having now fully described my invention, what I claim as new and desire to secure by Letters Patent, is:

1. An apparatus for forming tubes by extrusion comprising a die provided in its upper portion with an opening to receive a cylindrical blank having an axial aperture and provided in its lower portion with a small diameter extruding opening, a vertically reciprocatory punch adapted to enter said blank receiving opening and subject a blank therein to impact pressure to heat the same and extrude the major portion thereof through said extruding opening, leaving a small residue of said blank in said die, and operable means for moving a blank to a position in alinement with the blank receiving opening of said die after each withdrawal of said punch therefrom, whereby upon each succeeding operative movement of said punch a succeeding blank will be moved into contact with the residue of a preceding blank and subjected to impact pressure to extrude said residue and the major portion of said succeeding blank, said punch having a downwardly projecting part of a diameter less than the diameter of said extruding opening and adapted to extend through the aperture in the blank into said extruding opening and convert the latter into an annular orifice, said projecting part being of a length greater than the length of said succeeding blank and having a tapered end portion to enter said extruding opening and provide a relatively wide annular orifice during the extrusion of said residue.

2. The method of forming tubes by extrusion which comprises inserting an unheated cylindrical metal blank in a die having a relatively small extruding opening, converting said extruding opening into an annular orifice, subjecting said blank to impact pressure to heat the same and to extrude the major portion of the heated metal through said annular orifice, leaving in said die a small residue of metal attached to the extruded tube, inserting a second unheated cylindrical metal blank in said die in contact with the residue of the preceding blank, subjecting said second blank to impact pressure to heat the same and transfer a portion of said heat to said residue of said preceding blank and to extrude said residue and the major portion of said second blank through said annular orifice, and controlling the width of the latter orifice to provide the latter with a width sufficient to permit the extrusion of said residue in a relatively thick wall tubular form and to then reduce the width of said orifice to cause said second blank to be extruded in the form of a thin wall tube.

3. An apparatus for converting cylindrical apertured blanks into thin wall tubes comprising a die having an upper blank receiving opening and a downwardly and inwardly sloping bottom wall provided with a central opening, a punch including a pressure portion to enter said upper opening in said die and engage a blank therein and a pilot having a cylindrical portion to extend through the aperture in said blank and through the opening in said bottom wall to form an annular orifice, and means for actuating said punch to subject said blank to impact pressure to heat the same and extrude the major portion thereof through said annular orifice, leaving in said die a small residue which will be engaged by the blank next inserted in said die, whereby the action of said punch on the last mentioned blank will extrude said residue and the major portion of said last mentioned blank, said punch and said die having cooperating parts to progressively vary the width of said annular orifice to provide a relatively wide orifice for the extrusion of said residue, and a narrower orifice for the extrusion of said last mentioned blank.

4. An apparatus for converting cylindrical apertured blanks into thin wall tubes comprising a die having an upper blank receiving opening and a downwardly and inwardly sloping bottom wall provided with a central opening, a punch including a pressure portion to enter said upper opening in said die and engage a blank therein and a pilot having a cylindrical portion to extend through the aperture in said blank and through the opening in said bottom wall to form an annular orifice, means for actuating said punch to subject said blank to impact pressure to heat the same and extrude the major portion thereof through said annular orifice, leaving in said die a small residue which will be engaged by the blank next inserted in said die, said pilot having a tapered end portion and being of such length that when the pressure portion of said punch is in contact with a blank which is in engagement with said residue said tapered portion of said pilot will extend into said opening in said bottom wall and form an annular orifice of a width greater than the width of the annular orifice formed by the cylindrical portion of said pilot, whereby the downward movement of said punch will extrude said residue through said relatively wide orifice, then move the cylindrical portion of said pilot into said opening to reduce the width of said annular orifice and then extrude the major portion of the last mentioned blank through said orifice.

EMILE BLAIR.